US011811049B2

(12) United States Patent
Kim et al.

(10) Patent No.: US 11,811,049 B2
(45) Date of Patent: Nov. 7, 2023

(54) CARBON-BASED FIBER SHEET AND LITHIUM-SULFUR BATTERY INCLUDING SAME

(71) Applicant: LG CHEM, LTD., Seoul (KR)

(72) Inventors: Yun Kyoung Kim, Daejeon (KR); Taek Gyoung Kim, Daejeon (KR); Kwonnam Sohn, Daejeon (KR); Doo Kyung Yang, Daejeon (KR); Mira Im, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 356 days.

(21) Appl. No.: 17/115,016

(22) Filed: Dec. 8, 2020

(65) Prior Publication Data

US 2021/0098775 A1 Apr. 1, 2021

Related U.S. Application Data

(62) Division of application No. 16/060,660, filed as application No. PCT/KR2017/003155 on Mar. 23, 2017, now abandoned.

(30) Foreign Application Priority Data

Jun. 2, 2016 (KR) .......................... 10-2016-0068855
Mar. 13, 2017 (KR) .......................... 10-2017-0031126

(51) Int. Cl.
*H01M 4/133* (2010.01)
*D01F 9/20* (2006.01)
(Continued)

(52) U.S. Cl.
CPC ............ *H01M 4/133* (2013.01); *D01D 5/003* (2013.01); *D01D 5/0038* (2013.01); *D01D 5/20* (2013.01);
(Continued)

(58) Field of Classification Search
CPC ..................................................... H01M 4/133
See application file for complete search history.

(56) References Cited

U.S. PATENT DOCUMENTS

2003/0148187 A1  8/2003  Yamaguchi et al.
2010/0247909 A1  9/2010  Lee et al.
(Continued)

FOREIGN PATENT DOCUMENTS

CN  103855361 A  6/2014
CN  103922306 A  7/2014
(Continued)

OTHER PUBLICATIONS

Huang, Jian-Qiu, et al. "Novel interlayer made from Fe3C/carbon nanofiber webs for high performance lithium-sulfur batteries." Journal of Power Sources 285 (2015): 43-50. (Year: 2015).*

(Continued)

*Primary Examiner* — Sadie White
*Assistant Examiner* — Kayla Elaine Clary
(74) *Attorney, Agent, or Firm* — Birch, Stewart, Kolasch & Birch, LLP (57) ABSTRACT

Disclosed is a carbon-based fiber sheet and a lithium-sulfur battery including the same. The carbon-based fiber sheet for the lithium-sulfur battery is doped with a high concentration of nitrogen and thus plays a role of preventing diffusion by adsorbing lithium polysulfide eluted from a positive electrode during charging and discharging, thereby suppressing a shuttle reaction and thus improving capacity and lifecycle properties of the lithium-sulfur battery.

17 Claims, 6 Drawing Sheets

(51) Int. Cl.

| | | |
|---|---|---|
| *D01F 9/22* | (2006.01) | |
| *H01M 10/052* | (2010.01) | |
| *D01D 5/00* | (2006.01) | |
| *H01M 50/44* | (2021.01) | |
| *H01M 50/403* | (2021.01) | |
| *H01M 50/431* | (2021.01) | |
| *H01M 50/489* | (2021.01) | |
| *H01M 50/491* | (2021.01) | |
| *H01M 4/36* | (2006.01) | |
| *H01M 4/136* | (2010.01) | |
| *D06M 23/06* | (2006.01) | |
| *D06M 13/322* | (2006.01) | |
| *D01D 5/20* | (2006.01) | |
| *D01F 9/145* | (2006.01) | |
| *D04H 1/4242* | (2012.01) | |
| *D04H 1/728* | (2012.01) | |
| *H01M 4/58* | (2010.01) | |
| *H01M 4/583* | (2010.01) | |
| *H01M 4/80* | (2006.01) | |
| *H01M 10/0525* | (2010.01) | |

(52) U.S. Cl.
CPC ............ *D01F 9/145* (2013.01); *D01F 9/20* (2013.01); *D01F 9/22* (2013.01); *D04H 1/4242* (2013.01); *D04H 1/728* (2013.01); *D06M 13/322* (2013.01); *D06M 23/06* (2013.01); *H01M 4/136* (2013.01); *H01M 4/366* (2013.01); *H01M 4/583* (2013.01); *H01M 4/5815* (2013.01); *H01M 4/806* (2013.01); *H01M 10/052* (2013.01); *H01M 10/0525* (2013.01); *H01M 50/403* (2021.01); *H01M 50/431* (2021.01); *H01M 50/44* (2021.01); *H01M 50/489* (2021.01); *H01M 50/491* (2021.01); *H01M 2220/20* (2013.01); *Y02E 60/10* (2013.01)

(56) References Cited

U.S. PATENT DOCUMENTS

| | | |
|---|---|---|
| 2012/0214375 A1 | 8/2012 | Kitano et al. |
| 2014/0342249 A1 | 11/2014 | He et al. |
| 2015/0118578 A1 | 4/2015 | Kim et al. |
| 2015/0188126 A1 | 7/2015 | Kang et al. |
| 2016/0181666 A1 | 6/2016 | Lee et al. |
| 2016/0190547 A1 | 6/2016 | Schweiss |
| 2017/0110728 A1 | 4/2017 | Kobayashi et al. |
| 2017/0263978 A1 | 9/2017 | Koh et al. |

FOREIGN PATENT DOCUMENTS

| | | |
|---|---|---|
| CN | 104600349 A | 5/2015 |
| CN | 104900830 A | 9/2015 |
| CN | 105679983 A | 6/2016 |
| JP | 10-112319 A | 4/1998 |
| JP | 11-350258 A | 12/1999 |
| JP | 2010-146908 A | 7/2010 |
| KR | 2003-0029112 A | 4/2003 |
| KR | 10-0663715 B1 | 1/2007 |
| KR | 10-0783490 B1 | 12/2007 |
| KR | 10-2012-0002488 A | 1/2012 |
| KR | 10-1274662 B1 | 6/2013 |
| KR | 10-1422370 B1 | 7/2014 |
| KR | 10-2014-0121752 A | 10/2014 |
| KR | 10-1504709 B1 | 3/2015 |
| KR | 10-1558669 B1 | 10/2015 |
| KR | 10-2016-0032862 A | 3/2016 |
| KR | 10-2016-0050072 A | 5/2016 |
| KR | 10-2016-0051055 A | 5/2016 |
| KR | 10-2016-0051652 A | 5/2016 |
| KR | 10-2016-0076865 A | 7/2016 |
| WO | WO 2015/141853 A1 | 9/2015 |

OTHER PUBLICATIONS

Zhang, Biao, et al. "Correlation between atomic structure and electrochemical performance of anodes made from electrospun carbon nanofiber films." Advanced Energy Materials 4.7 (2014): 1301448. (Year: 2014).*
Lee, Kyung Jin, et al. "Activated carbon nanofiber produced from electrospun polyacrylonitrile nanofiber as a highly efficient formaldehyde adsorbent." Carbon 48.15 (2010): 4248-4255. (Year: 2010).*
Wang, Jiangan, Ying Yang, and Feiyu Kang. "Porous carbon nanofiber paper as an effective interlayer for high-performance lithium-sulfur batteries." Electrochimica Acta 168 (2015): 271-276. (Year: 2015).*
Chen et al., "Conductive Lewis Base Matrix to Recover the Missing Link of Li2S8 during the Sulfur Redox Cycle in Li—S Battery," Chem. Mater., 2015, 27 (6), pp. 2048-2055.
Extended European Search Report, dated Oct. 25, 2018, for European Application No. 17806876.3.
International Search Report (PCT/ISA/210) issued i PCT/KR2017/003155, dated Jun. 30, 2017.
Machine translation for CN 103855361A (Year:2014).
Park et al., "A Study on Electrical Resistivity Behaviors of PAN-based Carbon Nanofiber Webs," Carbon Science, vol. 8, No. 1, Mar. 2007, pp. 43-48.
Song et al., "Nitrogen-Doped Mesoporous Carbon Promoted Chemical Adsorption of Sulfur and Fabrication of High-Areal-Capacity Sulfur Cathode with Exceptional Cycling Stability for Lithium-Sulfur Batteries," Adv. Funct. Mater. 2014, 24, 1243-1250.
Song et al., "Strong Lithium Polysulfide Chemisorption on Electroactive Sites of Nitrogen-Doped Carbon Composites for High-Performance Lithium-Sulfur Battery Cathodes," Angew. Chem. Int. Ed. 2015, 54, 1-6.
Tian et al., "Bottum-up synthesis of nitrogen-doped graphene sheets for ultrafase lithium storage," Nanoscale, vol. 6, No. 11, Jan. 1, 2014, XP55511026, pp. 6075-6083.
Zhou et al., "Polydopamine-Coated, Nitrogen-Doped, Hollow Carbon-Sulfur Double-Layered Core-Shell Structure for Improving Lithium-Sulfur Batteries," Nano Lett. 2014, 14, 5250-5256.

* cited by examiner

CARBON-BASED FIBER SHEET AND LITHIUM-SULFUR BATTERY INCLUDING SAME

PRIORITY DATA

This application is a Divisional of U.S. patent application Ser. No. 16/060,660 filed on Jun. 8, 2018, which is the U.S. National Stage of PCT/KR2017/003155, filed Mar. 23, 2017, and which claims priority to Korean Patent Application No. 10-2016-0068855 filed on Jun. 2, 2016, and Korean Patent Application No. 10-2017-0031126 filed on Mar. 13, 2017, the entire contents of which are incorporated herein by reference.

TECHNICAL FIELD

The present invention relates to a carbon-based fiber sheet having excellent adsorption effect on lithium polysulfide and a lithium-sulfur battery including the same.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements in secondary batteries used as power sources for these products. Among them, a lithium secondary battery has been attracting considerable attention as a high-performance battery due to its high energy density and high standard electrode potential.

In particular, the lithium-sulfur (Li—S) battery is a secondary battery using a sulfur-based material having an S—S bond (sulfur-sulfur bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight. In addition, theoretical discharge capacity of the lithium-sulfur battery is 1,675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharge of the lithium-sulfur battery, an oxidation reaction of lithium occurs at the negative electrode and a reduction reaction of sulfur occurs at the positive electrode. Sulfur before discharging has an annular $S_8$ structure. During the reduction reaction (discharging), as the S—S bond is broken, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic $S_8$ structure to the linear lithium polysulfide (Li$_2$S$_x$, x=8, 6, 4, 2) by the reduction reaction. Eventually, when the lithium polysulfide is completely reduced, lithium sulfide (Li$_2$S) is finally produced. By the process of reducing to each lithium polysulfide, the discharge behavior of the lithium-sulfur battery is characterized by a step-wise discharge voltage unlike lithium ion battery.

Among lithium polysulfide such as Li$_2$S$_8$, Li$_2$S$_6$, Li$_2$S$_4$ and Li$_2$S$_2$, particularly, lithium polysulfide (Li$_2$S$_x$, usually x>4), which has a high oxidation number of sulfur, is easily dissolved in a hydrophilic electrolyte solution. The lithium polysulfide dissolved in the electrolyte solution diffuses away from the positive electrode where the lithium polysulfide is generated by the concentration difference. Thus, the lithium polysulfide eluted from the positive electrode is lost to the outside of the positive electrode reaction zone, making it impossible to perform the stepwise reduction to lithium sulfide (Li$_2$S). That is, since the dissolved lithium polysulfide which is present in the dissolved state away from the positive electrode and the negative electrode cannot participate in the charging and discharging reactions of the battery, the amount of sulfur participated in the electrochemical reaction is reduced at the positive electrode and as a result, it is a major factor in reducing the charging capacity and energy of the lithium-sulfur battery.

Furthermore, in addition to the lithium polysulfide diffused into the negative electrode floating or depositing in the electrolyte solution, the lithium polysulfide diffused into the negative electrode reacts directly with lithium and sticks to the surface of the negative electrode in the form of Li$_2$S, thus causing the corrosion of the lithium metal negative electrode.

In order to minimize the elution of lithium polysulfide, studies are underway to modify the morphology of the positive electrode complex, which forms a complex by immersing sulfur particles in various carbon structures or metal oxides.

On the other hand, it has been reported that when the carbon material is doped with nitrogen, the surface polarity changes and the lithium polysulfide is adsorbed. Particularly, among various nitrogen functional groups doped on carbon surface, pyrrolic group and pyridinic group are effective for the adsorption of lithium polysulfide (Chem. Mater., 2015, 27, 2048-2055/Adv. Funct. Mater., 2014, 24, 1243-1250). Therefore, it is necessary to take measures to improve the adsorption ability of lithium polysulfide by increasing the nitrogen content in the carbon material.

PRIOR ART LITERATURE

Patent Literature

Korean Patent Laid-Open Publication No. 2016-0032862, (2016 Mar. 25), Method for preparation of N-doped graphene and N-doped graphene prepared thereby.

Non-Patent Literature

Jia-Jia Chen et al., Conductive Lewis Base Matrix to Recover the Missing Link of Li$_2$S$_8$ during the Sulfur Redox Cycle in Li—S Battery, *Chem. Mater.*, 2015, 27, 2048-2055.

Jiangxuan Son et al., Nitrogen-Doped Mesoporous Carbon Promoted Chemical Adsorption of Sulfur and Fabrication of High-Areal-Capacity Sulfur Positive electrode with Exceptional Cycling Stability for Lithium-Sulfur Batteries, *Adv. Funct. Mater.*, 2014, 24, 1243-1250.

DISCLOSURE

Technical Problem

As described above, the lithium-sulfur battery has a problem in that battery capacity and lifecycle properties decline as charge and discharge cycle progress due to lithium polysulfide eluted and diffused from the positive electrode.

Accordingly, as a result of conducting various studies to solve the above problems, the inventors of the present invention have found that as the concentration of doped nitrogen in the carbon-based fiber sheet is increased, the lithium polysulfide eluted from the positive electrode was effectively suppressed, thereby improving battery capacity and lifetime.

Accordingly, an object of the present invention is to provide a carbon-based fiber sheet doped with a high concentration nitrogen.

Another object of the present invention is to provide a preparation method for the carbon-based fiber sheet.

In addition, still another object of the present invention is to provide a lithium-sulfur battery including the carbon-based fiber sheet.

Technical Solution

According to an object of the present invention, there is provided a carbon-based fiber sheet doped with a high concentration nitrogen.

According to another object of the present invention, there is provided a preparation method for the carbon-based fiber sheet doped with nitrogen at a high concentration.

According to still another object of the present invention, there is provided a lithium-sulfur battery including the carbon-based fiber sheet between a positive electrode and a separator.

Advantageous Effects

The carbon-based fiber sheet for a lithium-sulfur battery according to the present invention plays a role of preventing diffusion by adsorbing lithium polysulfide eluted from a positive electrode during charging and discharging. Thereby, lithium-sulfur battery capacity and lifecycle properties can be enhanced by suppressing diffusion of the lithium polysulfide, that is, suppressing a shuttle reaction.

BEST MODE

Hereinafter, embodiments of the invention will be described in detail with reference to the accompanying illustrative drawings. The drawings may be embodied in many different forms as one embodiment for purposes of describing the present invention and are not limited thereto. Here, in order to clearly illustrate the present invention in the drawings, portions not related to the description have been omitted, and similar reference numerals have been used for like parts throughout the specification. Also, the size and relative size of the components shown in the drawings are independent of the actual scale and may be reduced or exaggerated for clarity of description.

The present invention is intended to prevent diffusion of lithium polysulfide by interposing a carbon-based fiber sheet capable of adsorbing lithium polysulfide which is eluted from a positive electrode between the positive electrode and a separator of a lithium-sulfur battery. Each configuration will be described in detail below.

Carbon-Based Fiber Sheet

A carbon-based fiber sheet according to the present invention means a plurality of fibrous structures in which the carbon-based fiber forms a three-dimensional porous network structure. The fibrous structure includes a structure in which the carbon-based fiber forms an irregular aggregate in a plate-shaped form or the carbon-based fiber forms a regular aggregate in three dimensions through weaving.

At this time, the carbon-based fiber may be, but not limited thereto, at least one selected from the group consisting of carbon fiber, carbon nanofiber, graphite fiber and graphene fiber. Preferably, the carbon fiber is used, which may be crystalline or amorphous.

The carbon-based fiber sheet may be in the form of one or more fabrics selected from the group consisting of felt, mat, paper and cloth. Preferably, the felt is used.

The 'felt' means that the fibers produced by spinning process from carbon or graphite materials form an irregular aggregate in a plate-shaped form.

The 'mat' and 'paper' mean that by using an organic binder the fibers of the carbon material form into an aggregate in the form that is thinner than the felt.

The 'cloth' means that the carbon fibers prepared through spinning process and the like form a three-dimensionally regular aggregate through weaving.

The carbon-based fiber sheet has a three-dimensional network structure in which carbon-based fibers are regularly or irregularly bonded. Therefore, the carbon-based fiber sheet has excellent rigidity and is not easily deformed, and also has many pores, so that the movement of electrolyte solution can be smoothly occurred. In the carbon-based fiber sheet, micropores, mesopores, macropores, etc. are complexly present within the structure, and the control of the pores may vary depending on preparation method.

When using particles such as carbon black, there is a problem that they are difficult to be fixed within battery, and even if they are fixed, they move easily during operation of battery and therefore they are difficult to make uniform contact with electrolyte solution. In addition, for carbon-based fibers, they are excellent in chemical resistance, abrasion resistance, and heat resistance, and have light weight, and stability in a wide voltage range, etc. and thus are suitable for application to battery. In contrast, materials such as metal, etc. other than carbon have poor thermal, chemical, mechanical, and electrical and electronic properties compared to carbon, and they are difficult to satisfy all of the basic characteristics required for battery applications such as electrolyte humidification and resistance. Therefore, the use of carbon-based fiber sheets is most desirable in terms of form and material.

Particularly, in the present invention, the carbon-based fiber sheet is doped with nitrogen. The 'doped' or 'doping' mean that some of the carbon atoms constituting the carbon-based fiber are replaced with nitrogen atoms.

Studies on nitrogen-doped carbon materials have already been internationally one of the issues in the field of carbon materials. The main reason for this is that the number of valence electrons in a nitrogen atom is one more than the number of valence electrons in a carbon atom and the nitrogen atom is entered into the six-atoms cyclic structure of graphite by doping, and then forms the functional group including nitrogen such as pyridine, pyrrole, graphitized nitrogen, and pyridine oxide, thereby performing the adjustment to the electronic structure while improving the surface chemical activity of the carbon material.

Thus, there has been a prior art in which a carbon material doped with nitrogen is used to adsorb lithium polysulfide in a lithium-sulfur battery, but the nitrogen doping concentration was as low as 0.01 to 3% by weight, and thus satisfactory lithium polysulfide adsorption effect could not be obtained.

In the present invention, the carbon-based fiber sheet is doped with nitrogen at a high concentration of at least 5% by weight instead of carbon, thereby improving the lithium polysulfide adsorption ability and exhibiting improved electrochemical characteristics.

The carbon-based fiber sheet according to the present invention is doped with nitrogen in an amount of 5% by weight or more, preferably from 5 to 30% by weight, more preferably from 10 to 25% by weight based on the total weight of the carbon-based fiber sheet, and is characterized in that the doped nitrogen content is higher than that of the carbon material prepared through the conventional nitrogen doping process. When the doping concentration of nitrogen is less than the above range, the improvement effect on the lithium polysulfide adsorption ability cannot be obtained and on the contrary, when the doping concentration exceeds the above range, the capacity decrease and battery characteristics may be deteriorated.

The carbon-based fiber sheet of the present invention is interposed within the lithium-sulfur battery, specifically, between the positive electrode and the separator, as described later. Therefore, it is necessary to control the parameters so as to increase the adsorption ability of the lithium polysulfide without affecting original functions of the positive electrode and the separator, and without affecting the flow of electrolyte solution (i.e., lithium ion delivery, etc.) present between them.

The parameters may include diameters of fibers constituting the carbon-based fiber sheet, sizes of pores in the sheet, porosity, specific surface area and bulk density, and the above effects can be maximized by limiting them.

First, in order to enhance the polysulfide adsorption effect and to enhance the lithium ion delivery efficiency without deteriorating the performance of the lithium-sulfur battery, the sheet is made as a porous sheet. Accordingly, the carbon-based fiber sheet is made of the carbon-based fiber, and it is necessary to limit the diameter of the carbon-based fiber and the pore, the porosity and the bulk density of the carbon-based fiber sheet, and as a result, the effects as described above are maximized.

Specifically, the diameter of individual fibers constituting the carbon-based fiber sheet according to the present invention may be from 0.01 to 100 µm, preferably from 0.01 to 50 µm, more preferably from 0.05 to 10 µm, and the carbon-based fiber sheets with these properties are desirable to ensure excellent lithium polysulfide adsorption ability.

When the diameter of the carbon-based fiber is less than 0.01 µm, there arises a problem that during the heat treatment process for carbonization, the fiber shape is not maintained and the structure is collapsed. On the contrary, when the thickness exceeds 100 µm, there is a problem that the thickness of the carbon-based fiber sheet is too thick, and thus the energy density of the battery is rather lowed. Accordingly, the thickness is appropriately used within the above range.

In addition, the carbon-based fiber sheet according to the present invention may have a thickness of 0.1 to 100 µm, preferably 0.1 to 50 µm. When the thickness of the carbon-based fiber sheet is less than the above range, it is difficult to ensure the lithium polysulfide adsorption effect, and on the contrary, when the thickness exceeds the above range, it may act as a resistor and thus cause a problem in battery performance. It is most preferable that the thickness is from 0.1 to 50 µm considering that the thickness of a conventional positive electrode active material is 100 µm.

In addition, the carbon-based fiber sheet according to the present invention may have a pore size of 0.1 to 10 µm, a porosity of 5 to 90%, and a specific surface area of 5 to 500 $m^2/g$. Preferably, the size of the pores is from 0.5 to 5 µm, the porosity is from 30 to 90%, and the specific surface area is from 10 to 200 $m^2/g$. When such pore characteristics are applied to a lithium-sulfur battery, it is preferable to ensure an improved effect of the electrochemical characteristics without acting as a resistor. When the pores in the carbon-based fiber sheet are less than 0.1 µm, there is a problem that it is difficult for the electrolyte solution to penetrate into the sheet and thus the battery cannot be operated. On the contrary, when the pore size exceeds 10 µm, there is a problem that the adsorption of lithium polysulfide does not occur evenly due to the presence of large pores in the carbon-based fiber sheet. Therefore, the pore size is appropriately used within the above range.

In addition, when the porosity is higher than the above-described range, the mechanical properties of the carbon-based fiber sheet may be deteriorated, thereby causing problems when assembling or driving the battery. On the contrary, when the porosity is lower than the above-described range, the flow of the electrolyte solution is retarded, thereby increasing the pressure difference inside the battery, and thus there is a possibility that the performance of the battery may be deteriorated by the overvoltage. Therefore, the porosity is appropriately used within the above range. In addition, as a parameter related to the density of the carbon-based fiber sheet, the bulk density is from 0.05 to 0.2 $g/cm^3$, preferably from 0.1 to 0.15 $g/cm^3$ based on a thickness of 3 mm. When the bulk density is higher than the above-described range, the fluid flow of the electrolyte solution may be disturbed and thus the differential pressure within the battery may be increased. On the contrary, when the bulk density is lower than the above-mentioned range, the residence time of the electrolyte solution in the carbon-based fiber sheet cannot be maintained sufficiently.

The carbon-based fiber sheet of the present invention may further include a catalyst material in order to enhance the adsorption effect of lithium polysulfide.

The catalytic material may be a carbon-based conductive material and/or metal particle.

For example, the carbon-based conductive material may include one selected from the group consisting of carbon paper, carbon fiber, carbon black, acetylene black, activated carbon, fullerene, carbon nanotube, carbon nanowire, carbon nano-horn, carbon nano ring and combinations thereof.

The metal particle may be at least one selected from the group consisting of Na, Al, Mg, Li, Ti, Zr, Cr, Mn, Co, Cu, Zn, Ru, Pd, Rd, Pt, Ag, Au, W, Ti, Zr, Ni, Cu, and Fe. These may be those having a particle size of from a few nanometers to a few hundred microns for the catalytic effect of the electrochemical reaction, and preferably those having a nanoscale particle size.

The catalytic material is used at a level that does not prevent the flow of the electrolyte solution and can be used in a content of 10% by weight or less in the carbon-based fiber sheet.

The carbon-based fiber sheet according to the present invention as described above may be prepared using various methods.

For example, after the carbon-based fiber sheet is prepared, doping can be performed by depositing nitrogen atoms on the carbon-based fiber sheet through chemical vapor deposition or the like. However, this method adversely affects the improvement of the lithium polysulfide adsorption ability because nitrogen to be doped is not uniformly doped throughout the sheet.

Preferably, the carbon-based fiber sheet of the present invention can be prepared by spinning process, and in particular, a precursor with a high nitrogen content is used to allow the nitrogen to be doped at a high concentration.

Specifically, the carbon-based fiber sheet doped with nitrogen at a high concentration of the present invention is prepared via the steps comprising:
  i) preparing a spinning solution comprising a carbon-based precursor;
  ii) spinning the spinning solution to prepare a sheet in a form of a fibrous web;
  iii) stabilizing the sheet through heat treatment in the presence of oxygen; and
  iv) carbonizing the sheet in an inert atmosphere.

Hereinafter, each step will be described in detail.

First, a spinning solution is prepared by dissolving a carbon-based precursor in a solvent (step i)).

At this time, the carbon-based precursor may include a nitrogen-containing precursor containing nitrogen in the molecular structure and specifically contain nitrogen atoms by 5 to 20%. When it is out of the above range, it is not easy to control the doping concentration of nitrogen in the carbon-based fiber sheet after carbonization.

The carbon-based precursor may be at least one selected from the group consisting of polyacrylonitrile (PAN), polyaniline (PANI), polypyrrole (PPY), polyimide (PI), polybenzimidazole (PBI), polypyrrolidone (Ppy), polyamide (PA), polyamideimide (PAI), polyaramide, melamine, melamine-formaldehyde and fluorine mica, and according to one embodiment, it is preferable to apply polyacrylonitrile (PAN).

For example, in preparing the spinning solution, the carbon-based precursor may be a precursor that is either dissolved as it is or dissolved in the solvent. Specifically, a method of dissolving in a solvent is advantageous, and at this time, it is preferable that the carbon-based precursor is contained in an amount of 3 to 20 parts by weight based on 100 parts by weight of the solvent. When the content is less than 3 parts by weight, a kind of agglomerated part called bead is formed in each structure due to low viscosity at the time of electrospinning and thus a uniform fiber having a certain thickness cannot be produced. And when the content is more than 20 parts by weight, agglomeration in the fiber occurs, and the thickness of the prepared fiber sheet becomes uneven.

For example, the organic solvent for the preparation of the spinning solutions may include ethanol, methanol, propanol, butanol, isopropyl alcohol (IPA), dimethylformamide (DMF), acetone, tetrahydrofuran (THF), toluene, dimethylacetamide (DMAC) or the like. The solvent is selected so as to meet the characteristics of the polymer material which can exhibit hydrophilicity or hydrophobicity, and in the case of a polymer having hydrophilicity, not only organic solvent but also distilled water ($H_2O$) can be used.

For example, the spinning solution preferably has a viscosity in the range of 1,000 to 30,000 cP. The reason for this is that if the high viscosity of such a range is attained, although a high voltage is applied at the time of electrospinning, it can act to slow down the formation rate of the fibers and thus to induce the orientation of the fibers. The spinning solution can be prepared by selecting the polymer material made of chemical components having appropriate molecular weight, among known materials used as a carbon precursor material, so as to have the above-mentioned viscosity.

Next, the spinning solution is spun to produce a sheet in a form of a fibrous web (step ii)).

At this time, the spinning method and apparatus may be suitably performed by a person skilled in the art by selecting any known method and apparatus.

For example, it is preferable that the electrospinning is performed while the distance between the spinning nozzle and the current collector is fixed to 10 to 20 cm, the voltage is set to 10 to 60 kV, and the feeding rate of the spinning solution is adjusted to 0.5 to 100 ml per hour. Electrospinning is highly affected by the voltage applied between the electrodes. When the voltage is lower than the above range, fibrosis does not occur well and a large number of beads are likely to be formed in the resulting final sheet, and when the voltage is higher than the above range, the current is easy to flow while the insulated device is short-circuited. Preferably, the fibers are effectively formed by spinning at 15-20 cm intervals at 20-40 kV voltage. Also, the feeding rate of the solution in electrospinning is related to the production efficiency of the product. The feeding speed can be appropriately selected within the above range in consideration of the time required for sheet production.

As one embodiment, a sheet in the form of a fibrous web can be prepared by electrospinning a spinning solution comprising the carbon precursor. At this time, the sheet may be felt, mat, paper and cloth as described above, preferably felt. As another embodiment, the carbon fiber felt prepared from the above-mentioned carbon precursor containing nitrogen, which is sold in the market, can be purchased and used, and at this time, any carbon fiber felt is applicable irrespective of the prepared method.

For example, when electrospinning is performed using the spinning solution containing polyacrylonitrile, modified acrylics containing not only a homopolymer having a molecular weight of 150,000 or more but also a copolymer of 5 to 15% can be used. At this time, the copolymer may be composed of itaconic acid or methylacrylate, etc.

Next, the sheet is stabilized through heat treatment in the presence of oxygen (step iii)).

At this time, the heat treatment may be carried out in an oxidizing atmosphere at a temperature of 100 to 400° C., more preferably from 200 to 350° C., and the sheet may be stabilized by heating at a rate of 5 to 20° C./min for 1 to 10 hours. Since the conditions of the heat treatment are preferable for ensuring pore size and porosity for polysulfide adsorption, the stabilization conditions can be set within the above range.

Particularly, in the present invention, there is an advantage that as the carbon polymer is stabilized by contacting it with air through heat treatment in the presence of oxygen, conversion into a more stable chemical structure can be occurred and thus changed to carbon containing a large amount of nitrogen, thereby maximizing the doping effect of nitrogen. At this time, the flow rate of oxygen is preferably from 50 to 200 ml/min. When the flow rate of oxygen is less than the above range, there is a problem that the oxygen required for stabilization may be insufficient, and when the flow rate of oxygen exceeds the above range, there is a problem that the structure of the carbon-based fiber sheet is collapsed due to oxidation.

When the heating rate of the temperature is less than the above range in the stabilization step, it takes too long time, and when the heating rate of the temperature exceeds the above range, there is a problem that the stabilization reaction occurs rapidly. In addition, when the temperature is less than the above range, it takes a long time to stabilize, and when the temperature exceeds the above range, there is a problem that the sheet is oxidized.

For example, when polyacrylonitrile is applied as a nitrogen-containing carbon precursor, since the polyacrylonitrile should not be pyrolyzed in this stabilization process, the stabilization process is performed at a temperature lower than the pyrolysis temperature of the polyacrylonitrile used. Through the stabilization process, polyacrylonitrile can be stabilized (non-agglomeration).

Next, the sheet is carbonized in an inert atmosphere (step iv)).

At this time, the carbonization process may be perform to calcinate in an inert gas atmosphere such as helium (He), nitrogen ($N_2$), argon (Ar), neon (Ne) or xenon (Xe). When oxygen or air is present, since oxidation occurs and thus it is difficult to produce the sheet made only of carbon/nitrogen, carbonization is carried out in an inert atmosphere, and such carbonization process can proceed according to the conventional condition.

For example, the carbonization step is performed at a temperature of 600 to 1500° C., and it is preferable that in order to ensure pore size and porosity for the adsorption of lithium polysulfide, the calcination is performed while raising the temperature at a rate of 1 to 10° C./min. Therefore, the carbonization conditions may be set within the above range.

Lithium-Sulfur Battery

A carbon-based fiber sheet doped with nitrogen in a high concentration as set forth in one embodiment as described above can be preferably applied by interposing it between a positive electrode and a separator of a lithium-sulfur battery.

Figure 1:
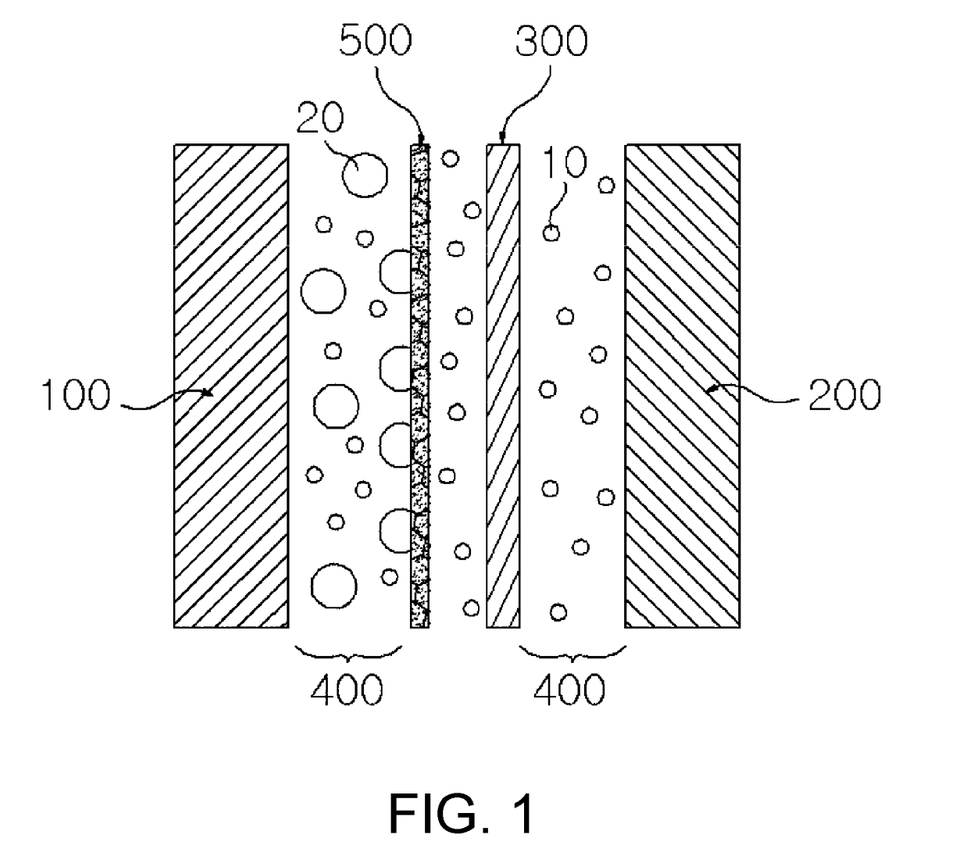
FIG. 1 is a cross-sectional view of a lithium-sulfur battery using a carbon-based fiber sheet of the present invention.

More specifically, as shown in FIG. 1, the lithium-sulfur battery including a positive electrode 100, a negative electrode 200, a separator 300, and an electrolyte 400 impregnated therein can be assembled by interposing a carbon-based fiber sheet 500 between the positive electrode 100 and the separator 300. The carbon-based fiber sheet 500 can allow the lithium ion 10 to be penetrated and can adsorb the lithium polysulfide 20, thereby increasing the initial discharge capacity and improving the overvoltage characteristics. In addition, the sheet exhibits excellent discharge capacity retention rates and maintains high capacity even after long cycles.

This carbon-based fiber sheet 500 can be also considered to be interposed between the separator 300 and the negative electrode 200 but does not play a large role in preventing direct adsorption of lithium polysulfide, and thus it is most advantageous that the carbon-based fiber sheet 500 is adjacent to the positive electrode 100. Also, if the sheet is interposed between the separator 300 and the negative electrode 200, there is a problem that the final thickness of the battery increases.

Meanwhile, the positive electrode 100 of the present invention may comprise elemental sulfur ($S_8$), a sulfur-based compound, or a mixture thereof as a positive electrode active material. Since they alone as a sulfur material are not electrically conductive, they are applied in combination with a conductive material. Specifically, the sulfur-based compound may be $Li_2S_n$ (n≥1), an organic sulfur compound, a carbon-sulfur polymer $((C_2S_x)_n$: x=2.5 to 50, n≥2) or the like.

The conductive material may be porous. Therefore, any conductive material may be used without limitation as long as it has porosity and conductivity, and for example, carbon-based materials having porosity may be used. Examples of such a carbon-based material may include carbon black, graphite, graphene, activated carbon, carbon fiber, and carbon nanotube (CNT). In addition, metallic fibers such as metal mesh; metallic powders such as copper, silver, nickel, and aluminum; or organic conductive materials such as polyphenylene derivatives may also be used. The conductive materials may be used alone or in combination.

The negative electrode 200 may include materials capable of reversibly intercalating or deinterclating lithium ion (Lit), materials capable of reversibly forming lithium containing compounds by reacting with lithium ion, lithium metal or lithium alloy as the negative electrode active material. The materials capable of reversibly intercalating or deinterclating lithium ion (Lit) can be, for example, crystalline carbon, amorphous carbon, or a mixture thereof. The materials capable of reacting with lithium ion (Lit) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Additionally, during the charging and discharging of the lithium-sulfur battery, the sulfur used as the positive electrode active material can be changed to an inactive material and thus can be attached to the surface of the lithium negative electrode. Such inactive sulfur means sulfur in which sulfur can no longer participate in the electrochemical reaction of the positive electrode through various electrochemical or chemical reactions. Inactive sulfur formed on the surface of the lithium negative electrode also has the advantage of acting as a protective layer of the lithium negative electrode.

The conventional separator 300 can be interposed between the positive electrode 100 and the negative electrode 200. The separator 300 is a physical separator having a function of physically separating electrodes. Any separator can be used without any particular limitations as long as it is used as a conventional separator. Particularly, a separator with excellent humidification ability of the electrolyte solution 400 while exhibiting low resistance to ion migration of electrolyte solution 400 is preferable.

In addition, the separator 300 enables the lithium ion to be transported between the positive electrode 100 and the negative electrode 200 while separating or insulating the positive electrode 100 and the negative electrode 200 from each other. The separator 300 may be made of a porous, nonconductive or insulating material. The separator 300 may be an independent member such as a film, or a coating layer added to the positive electrode and/or the negative electrode.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

The electrolyte 400 impregnated into the positive electrode 100, the negative electrode 200 and the separator 300 may be a non-aqueous electrolyte containing lithium salt and composed of lithium salt and an electrolyte solution. In addition, organic solid electrolytes and inorganic solid electrolytes, etc. may be used.

The lithium salt of the present invention may be a substance which can be easily dissolved in a non-aqueous organic solvent, and for example, may include at least one selected from the group consisting of $LiCl$, $LiBr$, $LiI$, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, $LiSCN$, $LiC(CF_3SO_2)_3$, $LiN(CF_3SO_2)_2$, $LiNO_3$, lithium chloroborane, lithium lower aliphatic carboxylate, and lithium imide.

The concentration of the lithium salt may be from 0.2 to 4 M, preferably from 0.3 to 2 M, more preferably, from 0.3 to 1.5 M depending on various factors such as the exact composition of the electrolyte mixture, the solubility of the salt, the conductivity of the dissolved salt, the charge and discharge conditions of the battery, the operating temperature and other factors known in the lithium battery field. When the concentration of the lithium salt is less than 0.2 M, the conductivity of the electrolyte may be lowered and thus the performance of the electrolyte may be deteriorated. When the concentration of the lithium salt exceeds 4 M, the viscosity of the electrolyte may increase and thus the mobility of the lithium ion (Lit) may be reduced.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers including ionic dissociation groups and the like can be used.

As the inorganic solid electrolyte of the present invention, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N, N-substituted imidazolidine, ethylene glycol dialkyl ether, ammonium salt, pyrrole, 2-methoxy ethanol, or aluminum trichloride, etc. for the purpose of improving charge-discharge characteristics, flame retardancy, and the like can be also added. In some cases, a halogen-containing solvent such as carbon tetrachloride, ethylene trifluoride or the like for the purpose of imparting nonflammability, and a carbon dioxide gas for the purpose of improving storage characteristics at a high temperature can be further included, and FEC (fluoro-ethylene carbonate), PRS (propene sultone), FPC (fluoro-propylene carbonate) and the like can be further included.

The battery pack including the lithium-sulfur battery as described above may be used as various power supplies such as electric vehicles (EVs), hybrid electric vehicles (HEVs), and plug-in hybrid electric vehicles (PHEVs), or power storage systems and the like.

A stacked electrode assembly can be prepared by interposing the separator 300 cut to a predetermined size corresponding to the positive electrode plate and the negative electrode plate between the positive electrode plate and the negative electrode plate formed by cutting the positive electrode 100 and the negative electrode 200 to a predetermined size, and laminating the carbon-based fiber sheet 500 between the positive electrode 100 and the separator 400.

In addition, stacked and folded electrode assemblies can be prepared by causing the positive electrode 100 and the negative electrode 200 to face each other with the separator 300 sheet being placed between the positive electrode 100 and the negative electrode 200, and interposing the carbon-based fiber sheet 500 between the positive electrode 100 and the separator 400 wherein two or more positive electrode plates and negative electrode plates are arranged on the separator sheet, or two or more unit cells, in which two or more positive electrode plates and negative electrode plates are stacked with the separator being interposed therebetween, are arranged on the separator sheet, and wherein the separator sheet is wound or the separator sheet is bent to the size of the electrode plate or the unit cell.

Hereinafter, the present invention will be described in detail by way of examples to illustrate the present invention. However, the examples according to the present invention can be modified into various other forms, and the scope of the present invention should not be construed as being limited to the embodiments described below. The examples of the present invention are provided to enable those skilled in the art to more fully understand the present invention.

Preparation Example

Polyacrylonitrile (PAN) as a 50 μm thick felt prepared by electrospinning was heat treated for 2 hours while raising the temperature at 200° C. in the air atmosphere at a rate of 10° C./min. Then, the carbon-based fiber sheet was produced by carbonizing for 2 hours while raising the temperature at a temperature of 700° C. at a rate of 5° C./min.

<Test Example 1> Analysis (1) Analysis of Nitrogen Content

Elemental analysis was performed to determine the nitrogen content of the carbon-based fiber sheet prepared in the above Preparation Example. As a result, it was confirmed that nitrogen was contained by 16% by weight.

(2) Analysis of Physical Properties

Figure 2:
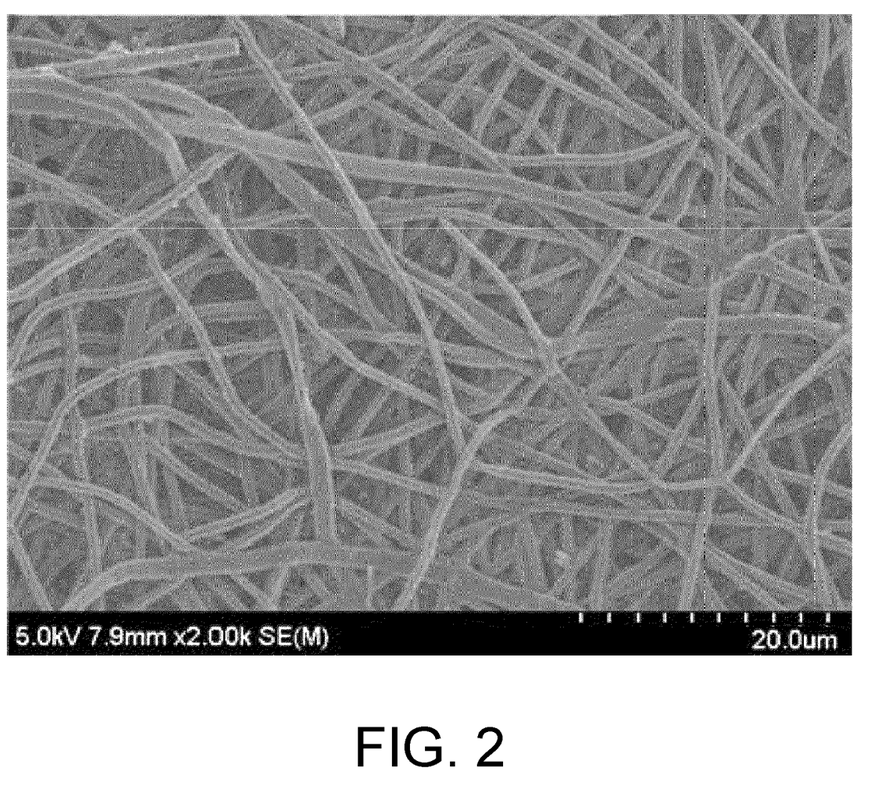
FIG. 2 is a scanning electron microscope image of a carbon fiber felt stabilized by heat treatment of polyacrylonitrile according to Preparation Example of the present invention.
Figure 3:
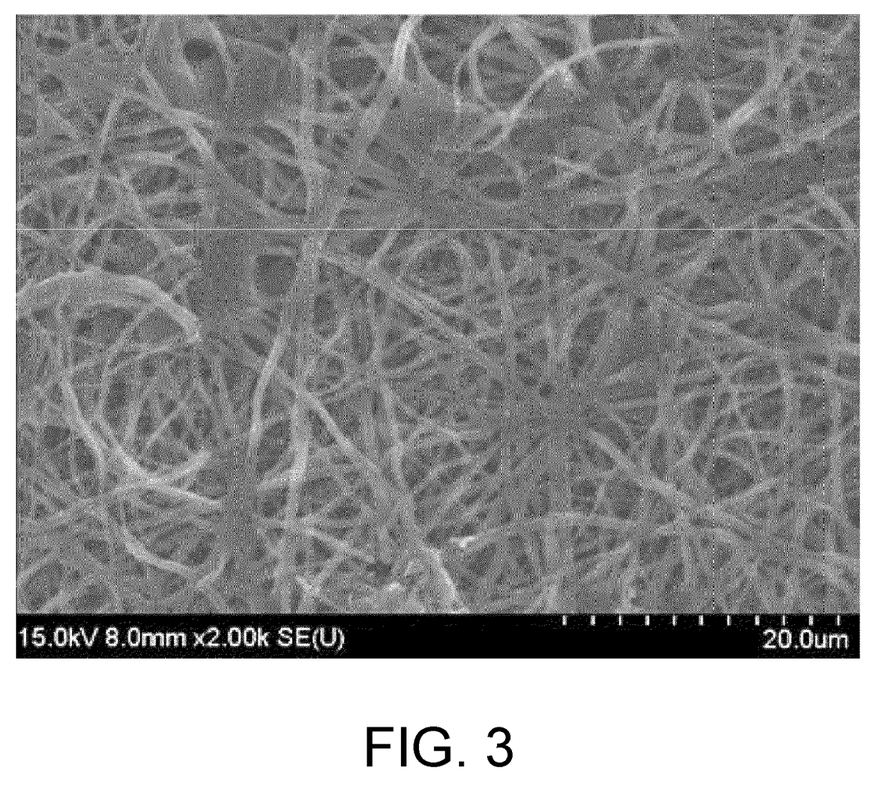
FIG. 3 is a scanning electron microscope image of a carbon-based fiber sheet prepared by carbonizing the carbon fiber felt according to Preparation Example of the present invention.

FIG. 2 is a scanning electron microscope image of the carbon fiber felt stabilized by heat treatment of polyacrylonitrile according to the preparation example of the present invention. FIG. 3 is a scanning electron microscope image of the carbon-based fiber sheet produced by carbonizing the carbon fiber felt according to the preparation example of the present invention.

Referring to FIGS. 2 and 3, it was confirmed that even after stabilization and carbonization, the carbon-based fiber constituting the carbon-based fiber sheet stably maintains the overall structure as well as the original fiber shape.

Also, it was confirmed that as a result of a scanning electron microscope (SEM) and BET (Brunauer, Emmett & Teller), the carbon-based fiber sheet of the present invention has the following physical properties.

Fiber diameter: 1 μm
Pore size: 4 μm
Specific surface area: 60 m$^2$/g
Bulk density: 0.001 g/cm$^3$
Sheet porosity: 50%
Sheet thickness: 14 μm

Example 1

A lithium-sulfur battery was prepared using the carbon-based fiber sheet prepared in the above Preparation Example.

First, the positive electrode mixture composed of 80% by weight of sulfur/carbon complex, 10% by weight of carbon black as a conductive material, and 10% by weight of PVDF (binder) was added to the solvent NMP (N-methyl-2-pyrrolidone) to prepare a positive electrode slurry. The positive electrode slurry was coated on an aluminum current collector having a thickness of 20 μm and dried to prepare a positive electrode for a lithium-sulfur battery having a thickness of 150 μm.

Lithium foil with a thickness of about 150 μm was used as a negative electrode and polyethylene with a thickness of 20 μm was used as a separator.

After laminating in the order of positive electrode, carbon-based fiber sheet, separator and negative electrode, a mixed solvent of dimethoxyethane, dioxolane and diglyme (14:65:21 by volume) as an electrolyte solution, in which 1M LiN(SO$_2$CF$_3$)$_2$ was dissolved, was injected to produce a lithium-sulfur battery.

Comparative Example 1

A lithium-sulfur battery was prepared in the same manner as in Example 1, except that the carbon-based fiber sheet was not included.

Comparative Example 2

Nitrogen-doped carbon particles were added to the positive electrode active material composition to produce a lithium-sulfur battery.

Specifically, 75% by weight of sulfur/carbon complex, 10% by weight of carbon black, 10% by weight of PVDF and 5% by weight of N-doped carbon particles were added to NMP (N-methyl-2-pyrrolidone) to produce a positive electrode slurry. The positive electrode slurry was coated on an aluminum current collector with a thickness of 20 μm and dried to prepare a positive electrode with a thickness of 150 μm.

Lithium foil with a thickness of 150 μm was used as the negative electrode, and polyethylene with a thickness of 20 μm was used as the separator.

After laminating in the order of positive electrode, separator and negative electrode, a mixed solvent of dimethoxyethane, dioxolane and diglyme (14:65:21 by volume) as an electrolyte solution, in which 1M LiN(SO$_2$CF$_3$)$_2$ was dissolved, was injected to produce a lithium-sulfur battery.

Test Example 2

After impregnation of the electrolyte solution, the lithium-sulfur batteries of the Example and Comparative Examples as prepared above were charging and discharging at a rate of 0.1 C for 10 hours, and data on initial discharge capacity, discharge cycle characteristic and charging and discharging efficiency were recorded. The results are shown in FIGS. 4 to 6.

Figure 4:
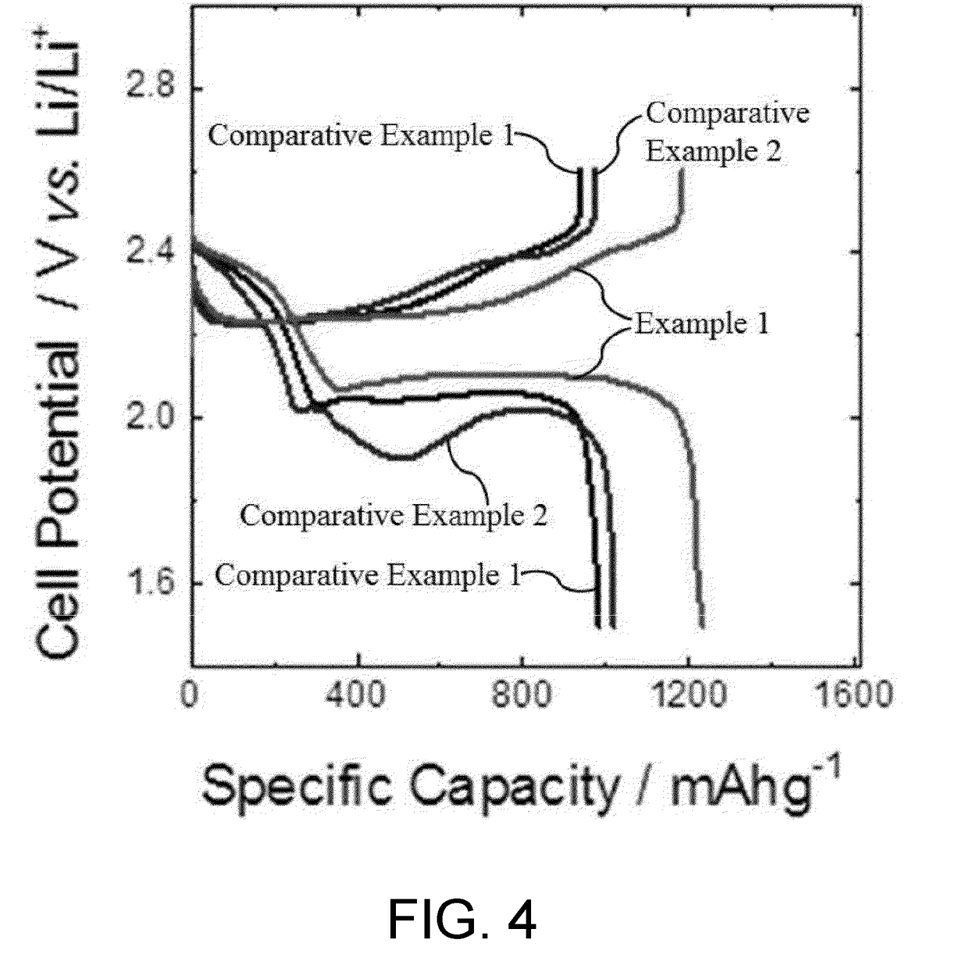
FIG. 4 is a graph showing initial discharge capacities of lithium-sulfur batteries according to Example and Comparative Examples of the present invention.

First, FIG. 4 is a graph showing the initial discharge capacity. It was confirmed from the graph that the lithium-sulfur battery of Example 1, in which a carbon-based fiber sheet containing nitrogen at a high concentration was interposed, had significantly increased initial discharge capacity and exhibited improved overvoltage compared to the lithium-sulfur battery of the Comparative Examples.

In particular, as shown in FIG. 4, it was confirmed that Comparative Example 2, in which nitrogen-doped carbon particles were contained in the positive electrode mixture, showed a slight increase in initial discharge capacity as compared with Comparative Example 1, but showed rather an increase in overvoltage during discharging process in accordance with the addition of nitrogen doped carbon particles with low electrical conductivity.

Figure 5:
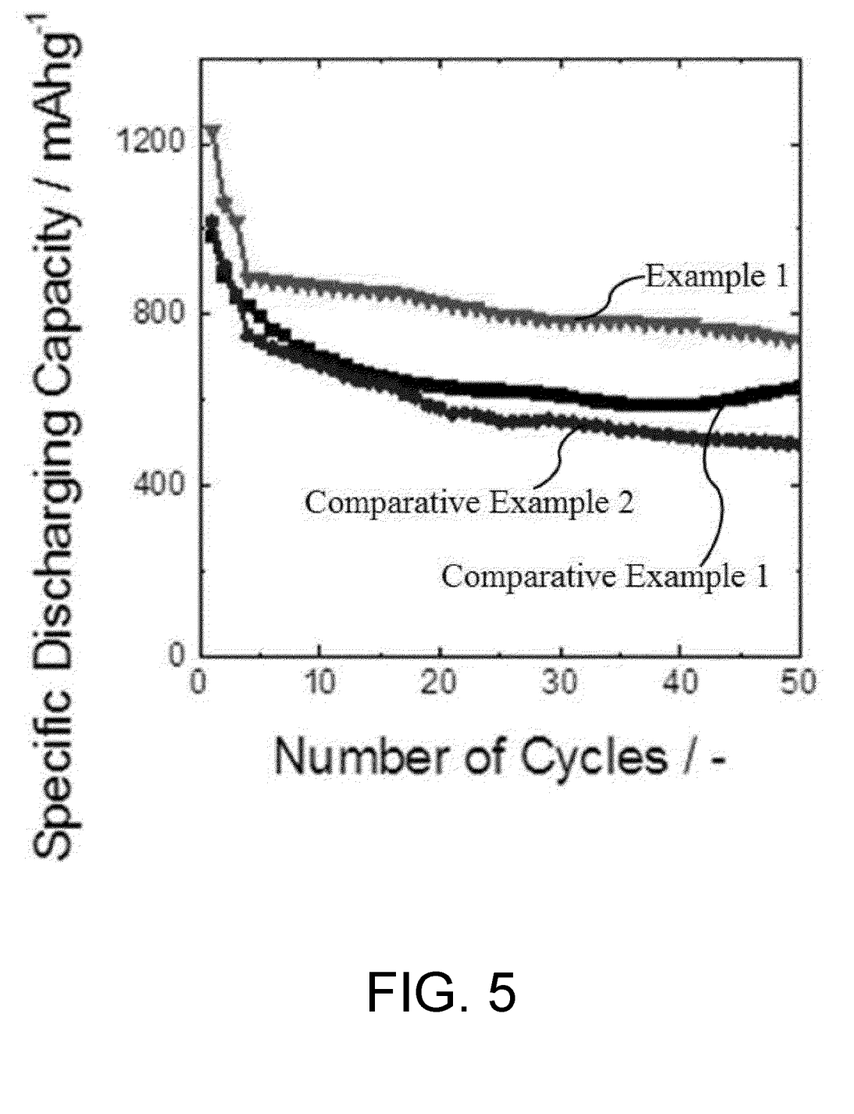
FIG. 5 is a graph showing cycle life characteristics of lithium-sulfur batteries according to Example and Comparative Examples of the present invention.
Figure 6:
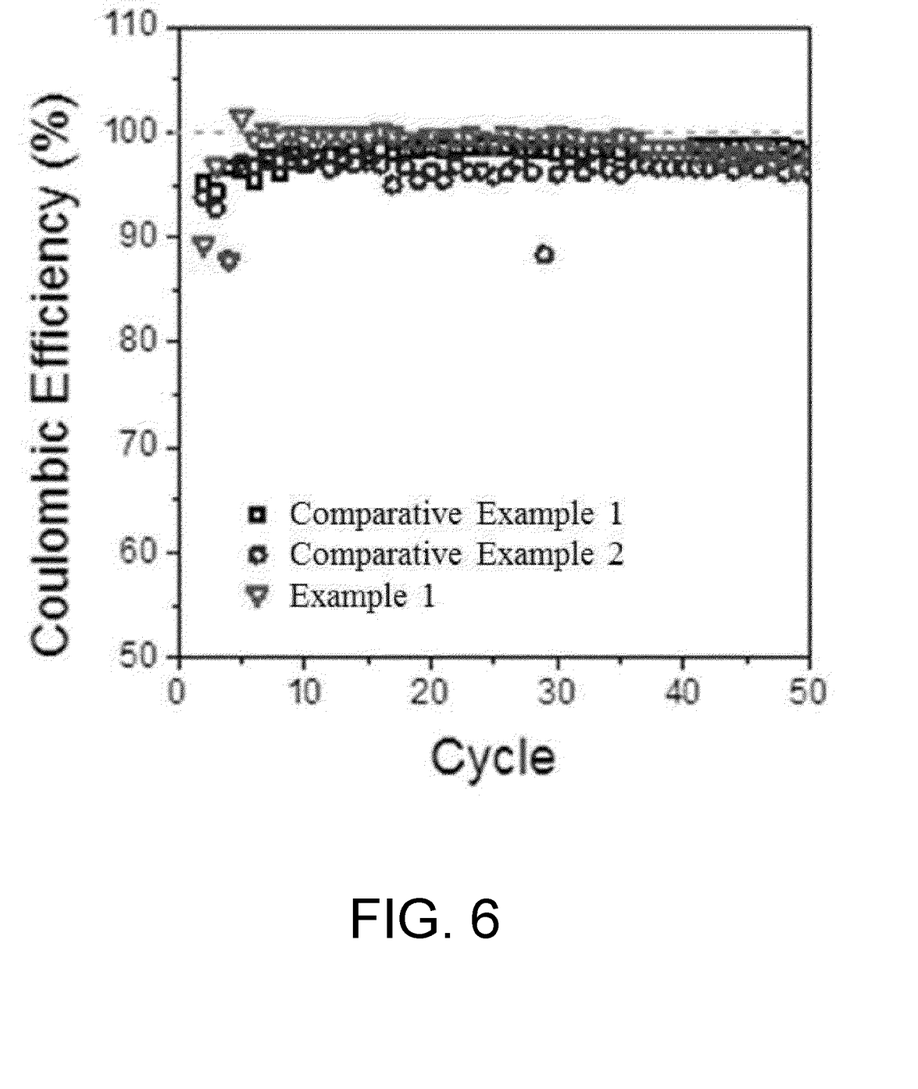
FIG. 6 is a graph showing charging and discharging efficiencies of lithium-sulfur batteries according to Example and Comparative Examples of the present invention.

FIG. 5 is a graph showing discharging cycle characteristics. It was shown that the lithium-sulfur battery of Example 1 exhibited a good discharge capacity retention rate and maintained the capacity at a level of about 740 mAh/g even after 50 cycles. Also, it can be confirmed from FIG. 5 that in the case of Comparative Example 2 containing nitrogen-doped carbon particles as an additive, the discharge capacity retention rate sharply drops.

FIG. 6 is a graph showing charging and discharging efficiency. In comparison with Comparative Examples 1 and 2, the lithium-sulfur battery according to Example 1 maintained efficiency of 99% or more even after 36 cycles.

Therefore, it was found from the results of FIGS. 4 to 6 that when the porous carbon sheet containing nitrogen at a high concentration according to the present invention is applied between the positive electrode and the separator, battery capacity and life characteristics can be improved.

DESCRIPTION OF SYMBOLS 10. lithium ion
20. lithium polysulfide
100. positive electrode
200. negative electrode
300. separator
400. electrolyte
500. carbon-based fiber sheet

The invention claimed is:

1. A lithium-sulfur battery comprising:
a positive electrode;
a negative electrode;
a separator interposed between the positive electrode and the negative electrode;
a carbon-based fiber sheet interposed between the positive electrode and the separator; and
an electrolyte impregnated thereinto,
wherein the carbon-based fiber sheet is doped with nitrogen at a concentration of 20% to 30% by weight based on a total weight of the carbon-based fiber sheet,
wherein the carbon-based fiber sheet is cloth, and
wherein the carbon-based fiber sheet has a thickness of 0.1 μm to 50 μm.

2. The lithium-sulfur battery according to claim 1, wherein the nitrogen is doped at a doping concentration of 25% to 30% by weight in the carbon-based fiber sheet.

3. The lithium-sulfur battery according to claim 1, wherein the carbon-based fiber comprises at least one selected from the group consisting of carbon fiber, carbon nanofiber, graphite fiber and graphene fiber.

4. The lithium-sulfur battery according to claim 1, wherein the carbon-based fiber sheet comprises a carbon-based fiber having a diameter of 0.05 μm to 10 μm.

5. The lithium-sulfur battery according to claim 1, wherein the carbon-based fiber sheet has a pore size of 0.1 μm to 10 μm and a porosity of 5% to 90%.

6. The lithium-sulfur battery according to claim 1, wherein the carbon-based fiber sheet has a specific surface area of 5 $m^2/g$ to 500 $m^2/g$ and a bulk density of 0.05 $g/cm^3$ to 0.2 $g/cm^3$.

7. The lithium-sulfur battery according to claim 1, wherein the carbon-based fiber sheet is prepared by a method comprising:
   i) preparing a spinning solution comprising a carbon-based precursor;
   ii) spinning the spinning solution to prepare a sheet in a form of a fibrous web;
   iii) stabilizing the sheet through heat treatment in the presence of oxygen;
   iv) carbonizing the sheet in an inert atmosphere, and
   v) forming a regular aggregate in three dimensions from the fibrous web, through weaving to form a cloth;
wherein the carbon-based precursor contains a nitrogen element in the molecular structure.

8. The lithium-sulfur battery according to claim 7, wherein the carbon-based precursor in step i) is at least one selected from the group consisting of polyacrylonitrile, polyaniline, polypyrrole, polyimide, polybenzimidazole, polypyrrolidone, polyamide, polyamideimide, polyaramid, melamine, melamine-formaldehyde and fluorine mica.

9. The lithium-sulfur battery according to claim 7, wherein the carbon-based precursor has a molecular structure comprising from 5% to 20% of nitrogen atoms in the molecular structure.

10. The lithium-sulfur battery according to claim 7, wherein the heat treatment in step iii) is carried out at a temperature of 100° C. to 400° C.

11. The lithium-sulfur battery according to claim 7, wherein the heat treatment in step iii) is carried out in an oxidizing atmosphere.

12. The lithium-sulfur battery according to claim 7, wherein the carbonization in the step iv) is carried out at a temperature of 600° C. to 1500° C.

13. The lithium-sulfur battery according to claim 7, wherein the carbonization in step iv) is carried out in the inert gas atmosphere.

14. A lithium-sulfur battery according to claim 1, wherein the carbon-based fiber sheet further comprises a catalyst material.

15. A lithium-sulfur battery according to claim 14, wherein the catalyst material is a carbon-based conductive material and/or metal particle.

16. A lithium-sulfur battery according to claim 15, wherein the carbon-based conductive material comprises carbon paper, carbon fiber, carbon black, acetylene black, activated carbon, fullerene, carbon nanotube, carbon nanowire, carbon nano-horn, carbon nano ring, or combinations thereof.

17. A lithium-sulfur battery according to claim 15, wherein the metal particle comprises Na, Al, Mg, Li, Ti, Zr, Cr, Mn, Co, Cu, Zn, Ru, Pd, Rd, Pt, Ag, Au, W, Ni, Fe, or combinations thereof.

* * * * *